United States Patent
Zheng et al.

(10) Patent No.: US 9,388,698 B2
(45) Date of Patent: Jul. 12, 2016

(54) ROTOR COOLING

(71) Applicant: General Electric Company, Schenectady, NY (US)

(72) Inventors: Xiaoqing Zheng, Niskayuna, NY (US); Sanjay Chopra, Niskayuna, NY (US); Thomas Joseph Farineau, Schoharie, NY (US); Tai Joung Kim, Glenville, NY (US); Richard James Miller, Jr., Round Lake, NY (US)

(73) Assignee: General Electric Company, Schenectady, NY (US)

( * ) Notice: Subject to any disclaimer, the term of this patent is extended or adjusted under 35 U.S.C. 154(b) by 477 days.

(21) Appl. No.: 14/079,610

(22) Filed: Nov. 13, 2013

(65) Prior Publication Data

US 2015/0132107 A1 May 14, 2015

(51) Int. Cl.
| | |
|---|---|
| *F01D 5/08* | (2006.01) |
| *F01D 11/08* | (2006.01) |
| *F01D 11/02* | (2006.01) |
| *F01D 25/12* | (2006.01) |

(52) U.S. Cl.
CPC ............. *F01D 5/085* (2013.01); *F01D 11/02* (2013.01); *F01D 25/12* (2013.01); *Y02T 50/676* (2013.01)

(58) Field of Classification Search
CPC ......... F01D 5/085; F01D 11/02; F01D 25/12; Y02T 50/676
See application file for complete search history.

(56) References Cited

U.S. PATENT DOCUMENTS

| | | | | |
|---|---|---|---|---|
| 3,989,410 A * | 11/1976 | Ferrari | ...................... | F01D 3/00 415/115 |
| 4,822,244 A * | 4/1989 | Maier | ................... | F01D 5/3015 415/115 |
| 5,245,821 A | 9/1993 | Thomas, Jr. et al. | | |
| 5,555,721 A * | 9/1996 | Bourneuf | ................. | F02C 7/18 415/115 |
| 6,050,079 A | 4/2000 | Durgin et al. | | |
| 6,773,225 B2 * | 8/2004 | Yuri | ........................ | F01D 5/08 415/1 |
| 6,787,947 B2 * | 9/2004 | Coulon | ................... | F01D 5/081 310/52 |
| 6,945,749 B2 * | 9/2005 | De Cardenas | ......... | F01D 5/081 415/115 |
| 7,048,497 B2 * | 5/2006 | Arilla | ...................... | F01D 5/081 415/116 |
| 7,331,763 B2 * | 2/2008 | Higgins | ................... | F01D 5/08 415/176 |
| 8,381,533 B2 * | 2/2013 | Smoke | ................... | F01D 5/081 415/115 |
| 8,578,720 B2 * | 11/2013 | Ebert | ...................... | F01D 5/081 415/115 |

\* cited by examiner

*Primary Examiner* — Igor Kershteyn
(74) *Attorney, Agent, or Firm* — Ernest G. Cusick; Hoffman Warnick LLC

(57) ABSTRACT

Embodiments of the invention relate generally to rotor cooling and, more particularly, to a stator member having at least one passage for the delivery of cooling steam to a bucket root. In one embodiment, the invention provides a turbine comprising: a rotor including a first bucket root; and a stator member having: a rotor bore within which at least a portion of the rotor is disposed; a facing end adjacent to the first bucket root of the rotor; a plurality of seals within the rotor bore for sealing against the rotor, the plurality of seals including a first seal nearest the facing end and a second seal adjacent to the first seal; and a plurality of passages, each extending from a surface of the rotor bore at a point between the first seal and the second seal and extending through the facing end.

20 Claims, 6 Drawing Sheets

US 9,388,698 B2

ROTOR COOLING

BACKGROUND OF THE INVENTION

Cooling of the first wheelspace adjacent to a rotor bucket has been employed in many turbomachines, including steam turbines. Typically, such cooling employs the diversion of steam from a later stage of a high-pressure section to the first wheelspace of an intermediate-pressure section. It has now been discovered, however, that, in an operative state, the swirl ratio of the cooling flow—defined as the circumferential speed of the cooling steam divided by the speed of the rotor—is important in providing efficient cooling and extending rotor life. Also important is the pressure drop between the source of the cooling steam and a point at which it is released to the wheelspace. Embodiments of the invention describe the improvement and/or interaction of both swirl ratio and pressure drop to provide more efficient cooling flow.

BRIEF DESCRIPTION OF THE INVENTION

In one embodiment, the invention provides a turbine comprising: a rotor including a first bucket root; and a stator member having: a rotor bore within which at least a portion of the rotor is disposed; a facing end adjacent to the first bucket root of the rotor; a plurality of seals within the rotor bore for sealing against the rotor, the plurality of seals including a first seal nearest the facing end and a second seal adjacent to the first seal; and a plurality of passages, each passage extending from a surface of the rotor bore at a point between the first seal and the second seal and extending through the facing end.

In another embodiment, the invention provides a stator member for a turbine, the stator member comprising: an elongate body; a rotor bore within and along a longitudinal axis of the elongate body; at least one passage having a first opening on a surface of the rotor bore and extending through the elongate body to a second opening on a facing end of the elongate body, the facing end lying along a plane substantially perpendicular to the longitudinal axis of the elongate body; and a first recess along the surface of the rotor bore for containing a sealing device, the first recess being disposed between the facing end and the first opening of the at least one passage.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements among the drawings.

DETAILED DESCRIPTION OF THE INVENTION

Figure 1:
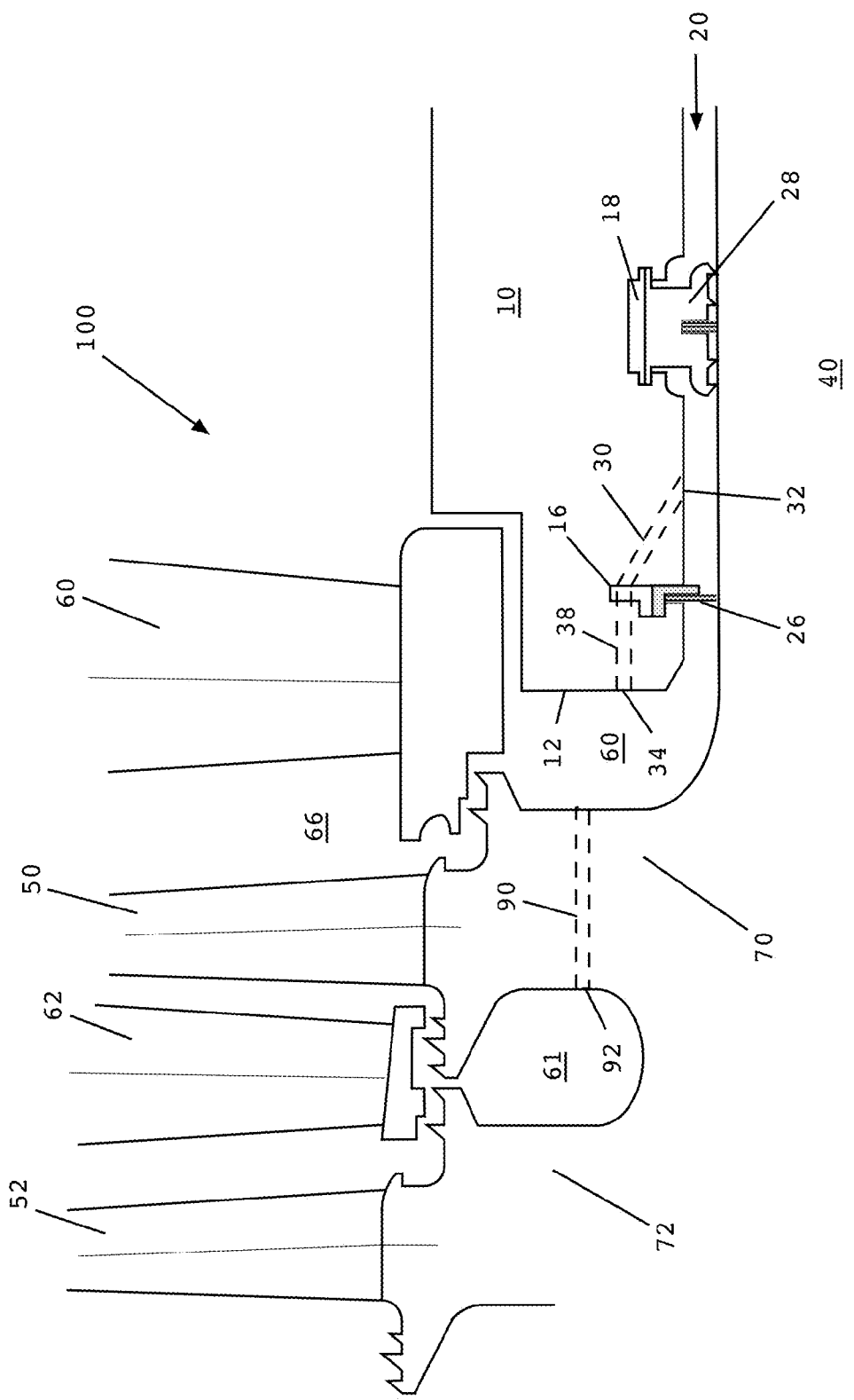
FIG. 1 shows a schematic cross-sectional side view of a portion of a turbine according to an embodiment of the invention.

FIG. 1 shows a schematic cross-sectional side view of a portion of a turbine 100 according to one embodiment of the invention. In FIG. 1, a rotor 40 resides within a rotor bore 20 of a stator member 10. A first wheelspace 60 exists between a facing end 12 of stator 10 and a first bucket root 70 of bucket 50. As can be seen in FIG. 1, bucket 50 is one of a plurality of buckets 50, 52 affixed to rotor 40, which alternate a plurality of non-rotating nozzles 60, 62, as is typical of turbomachines such as turbine 100. Those with knowledge in the art understand that the term "blade" is usually used for aviation turbines, while the term "bucket" is typically used when describing the same type of component for land-based turbines. For simplicity, however, the term "bucket" shall be used herein to collectively refer to buckets or blades.

A plurality of seals 26, 28 reside within seal cavities 16, 18, respectively, of stator 10 and act to seal rotor 40 against stator 10. As shown in FIG. 1, first seal 26 is a brush seal while second seal 28 is a packing ring. Other seal configurations and combinations are possible, of course, and are within the scope of the invention.

In the embodiment of FIG. 1, a first passage 30 extends from a first opening 32 between first seal 26 and second seal 28, through a second passage 38 and stator 10, to a second opening 34 on facing end 12 of stator 10. Cooling steam is thereby allowed to pass from between first seal 26 and second seal 28 to first wheelspace 60, thereby cooling first bucket root 70. As will be described in greater detail below, second passage 38 is angled tangentially (circumferentially) with respect to a longitudinal axis of stator 10, such that cooling steam contacts first bucket root 70 at an angle. However, first passage 30 may also optionally be angled tangentially with respect to a longitudinal axis of stator 10. Typically, such an angle will be in the direction of rotation of rotor 40, such that the swirl ratio of the cooling steam and the attendant heat extraction efficiency are increased. Second passage 38 may comprise or include a convergent or a convergent-divergent section to accelerate the flow exiting opening 34.

As shown in FIG. 1, an optional additional passage 90 may be provided in first bucket root 70, such that cooling steam directed into first wheelspace 60 may continue to flow through bucket root 70 and into second wheelspace 61 between first bucket root 70 and second bucket root 72. Again, additional passage 90 and/or its opening 92 into second wheelspace 61 may be angled with respect to a longitudinal axis of stator 10. Such angling may be, for example, in the direction of rotation of rotor 40.

An additional advantage of the introduction of cooling steam into first wheelspace 60, particularly where a significant increase in pressure is achieved within first wheelspace 60, is a reduction in leakage of operating hot steam from steam path 66 into first wheelspace 60, which would act to heat bucket root 70.

Figure 2:
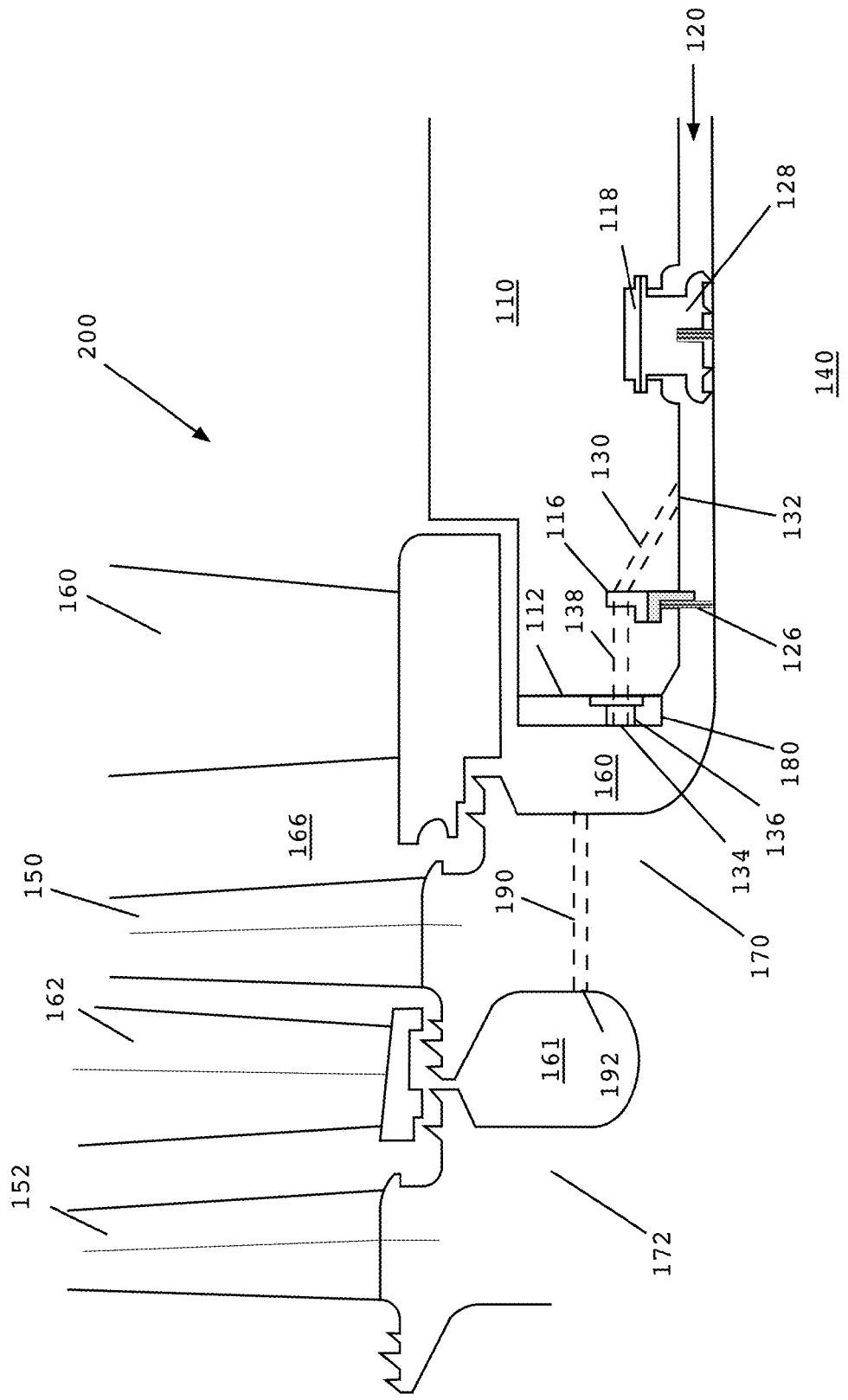
FIG. 2 shows a schematic cross-sectional side view of a portion of a turbine according to another embodiment of the invention.

FIG. 2 shows a schematic cross-sectional side view of a portion of a turbine 200 according to another embodiment of the invention. Here, an inducer plate 180 has been attached to facing end 112 of stator 110. According to some embodiments of the invention, inducer plate 180 is non-fixedly attached to facing end 112, such that it can be replaced. According to some embodiments of the invention, first passage 130 and second passage 138 may not be tangentially angled for ease of manufacture. In such a case, inducer passage 136 may be angled tangentially with respect to the longitudinal axis of stator 110, providing substantially the same angling of cooling steam as it exits inducer plate 180 as if first passage 130 and/or second passage 138 were angled. Again, inducer passage 136 may include a convergent or a convergent-divergent section to accelerate the flow exiting opening 134.

Figures 3, 4:
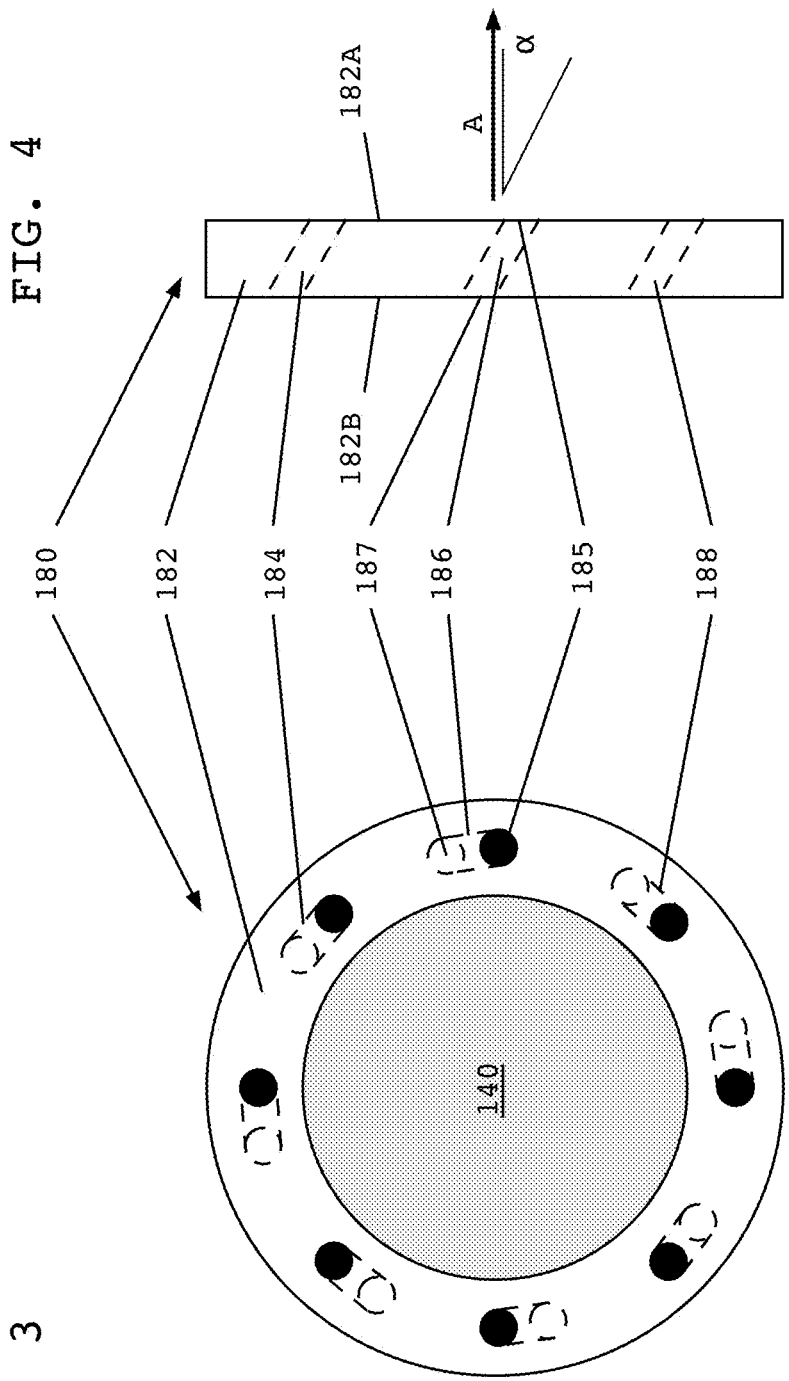
FIG. 3 shows a facing view of an inducer plate according to an embodiment of the invention.
FIG. 4 shows a side view of the inducer plate of FIG. 3.

FIGS. 3 and 4 show, respectively, facing and side views of one embodiment of inducer plate 180 in which passages 182, 184, 186 are so angled tangentially (circumferentially). Although only three passages 182, 184, 186 are labeled in FIGS. 3 and 4 and shown in FIG. 4, this is merely for the sake of simplicity of illustration. In addition, it should be appreciated that any number of passages of any size or of varying sizes may be employed, depending on the requirements of the situation in which inducer plate 180 will be employed.

In the embodiment shown in FIGS. 3 and 4, inducer plate 180 comprises a body 182 having a first face 182A and a second face 182B and a plurality of passages 184, 186, 188 passing from first face 182A to second face 182B. Either first face 182A or second face 182B is placed in contact with facing end 112 (FIG. 2) of stator 110 (FIG. 2), such that passages 182, 184, 186 are in communication with second passage 138. As shown in FIG. 4, each passage 184, 186, 188 is angled at angle α with respect to a longitudinal axis A of stator 110, i.e., a line substantially perpendicular to first face 182A and/or second face 182B. For passage 186, for example, opening 185 on face 182A and opening 187 on face 182B are labeled. Inducer plate 180 may be attached to facing end 112 using any known or later-developed device or method, including, for example, bolts, screws, or other fasteners, welding, etc.

The angle α to which passages 184, 186, 188 are angled tangentially with respect to longitudinal axis A of stator 110 (FIG. 2) will vary, of course, depending on the desired effect of such angling. Typically, however, angle α is between about 45° and about 90° from longitudinal axis A of stator 110, e.g., between about 60° and about 85°, or about 80°. As noted above, Applicants have discovered that the swirl ratio of the cooling steam—defined as the circumferential speed of the cooling steam divided by the speed of the rotor—is important in providing efficient cooling and extending rotor life. More specifically, Applicants have discovered that a swirl ratio of about 1.7 or greater results in a higher heat transfer rate. Angles between about 45° and about 90° from the longitudinal axis of stator 110 have been found to achieve such swirl ratios.

Figure 5:
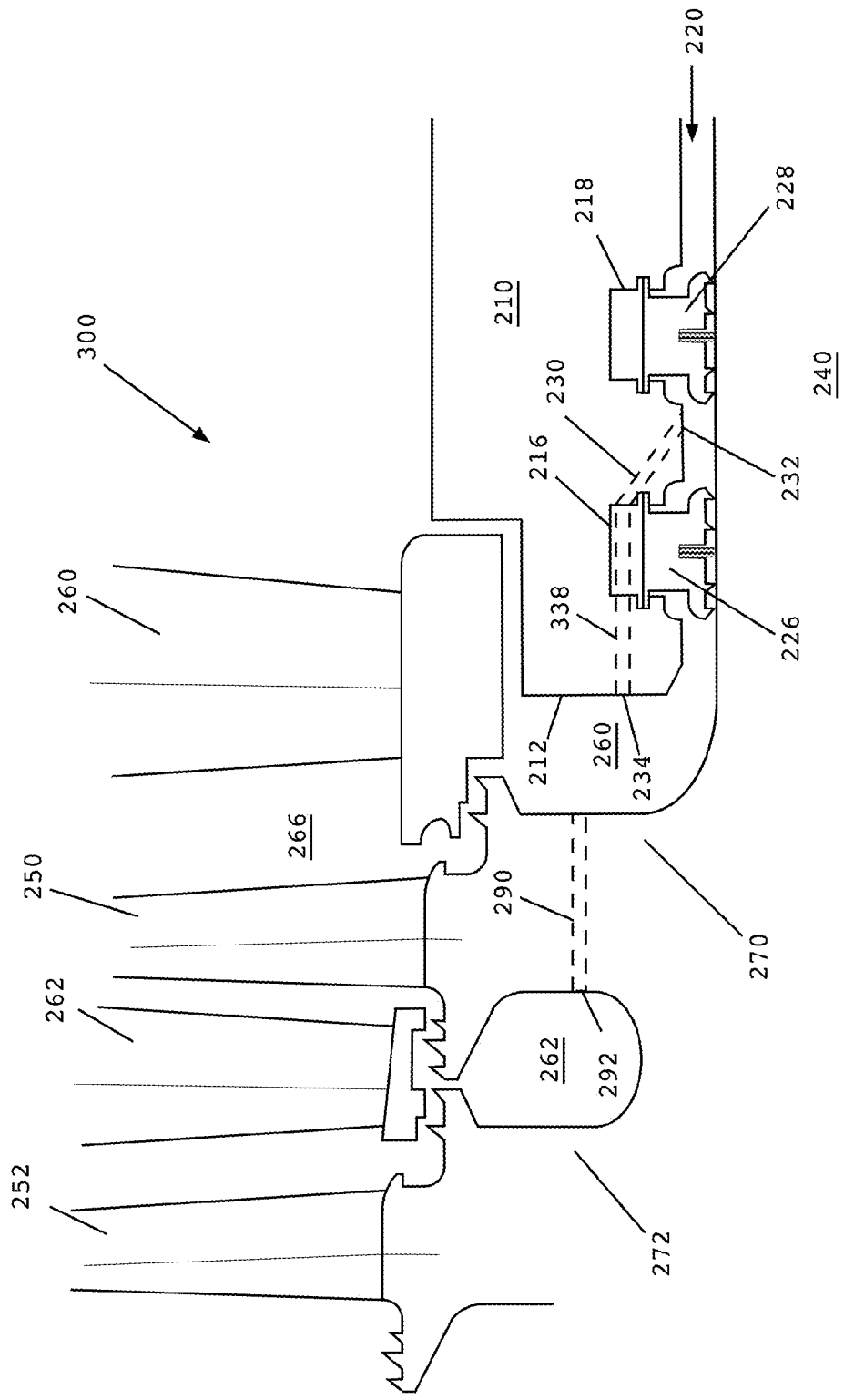
FIG. 5 shows a schematic cross-sectional side view of a portion of a turbine according to another embodiment of the invention.
Figure 6:
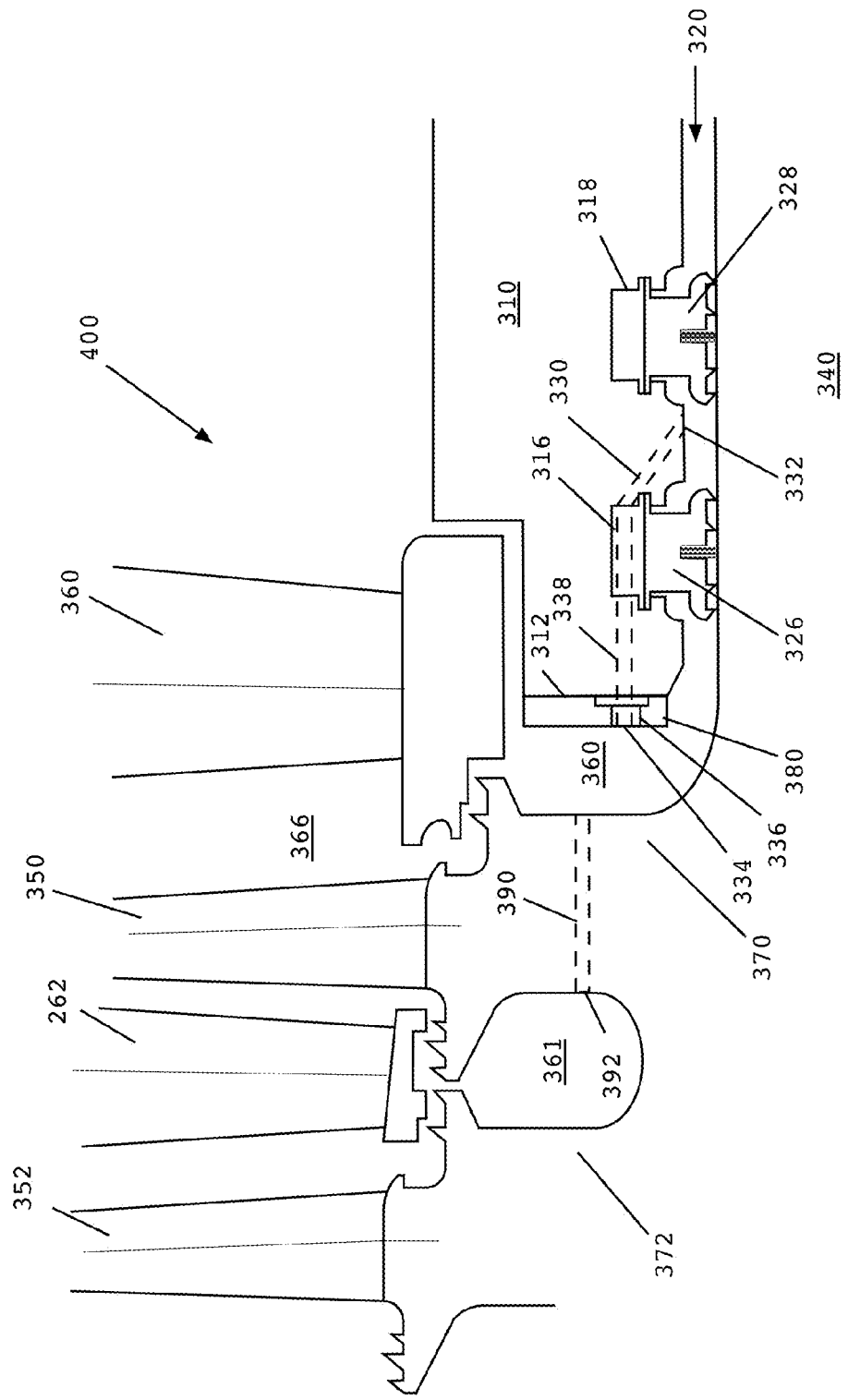
FIG. 6 shows a schematic cross-sectional side view of a portion of a turbine according to another embodiment of the invention.

FIGS. 5 and 6 show schematic cross-sectional side views of portions of turbines 300, 400 according to other embodiments of the invention. In FIG. 5, first seal 226 is a packing ring rather than a brush seal, as in FIG. 1. In FIG. 6, optional inducer plate 380 has been attached to facing end 312 of stator 310.

In addition, Applicants have found that limiting the size and/or number of points at which cooling steam is delivered to first wheelspace 60 (FIG. 1) improves heat transfer and, in some cases, also increases the swirl ratio. For example, by limiting the size and/or number of passages 30 (FIG. 1) or the size and/or number of second openings 34 (FIG. 1) into first wheelspace 60, to achieve a pressure difference of 50 psid (pounds per square inch differential) or more, which accelerates the cooling steam, Applicants have found that heat transfer can be greatly improved. In some cases, the improvement in heat transfer is as much as 80%. In some embodiments, the pressure difference is up to 80 psid.

In some embodiments of the invention, improvements in heat transfer are achieved through a combination of angling passages 184, 186, 188 and increasing a pressure difference of the cooling steam to accelerate the flow. It should be noted, however, that, in other embodiments of the invention, angle α may be at or near 0°, such that passages 184, 186, 188 are oriented substantially parallel to or at a shallow angle relative to first face 182A and second face 182B of inducer plate 180, with heat transfer improvement achieved primarily by increasing the pressure difference of the cooling steam. In still other embodiments, heat transfer improvement is achieved primarily by angling passages 184, 186, 188, with no deliberate or significant increase in the pressure difference of the cooling steam, i.e., the pressure difference being less than about 50 psid.

Figure 7:
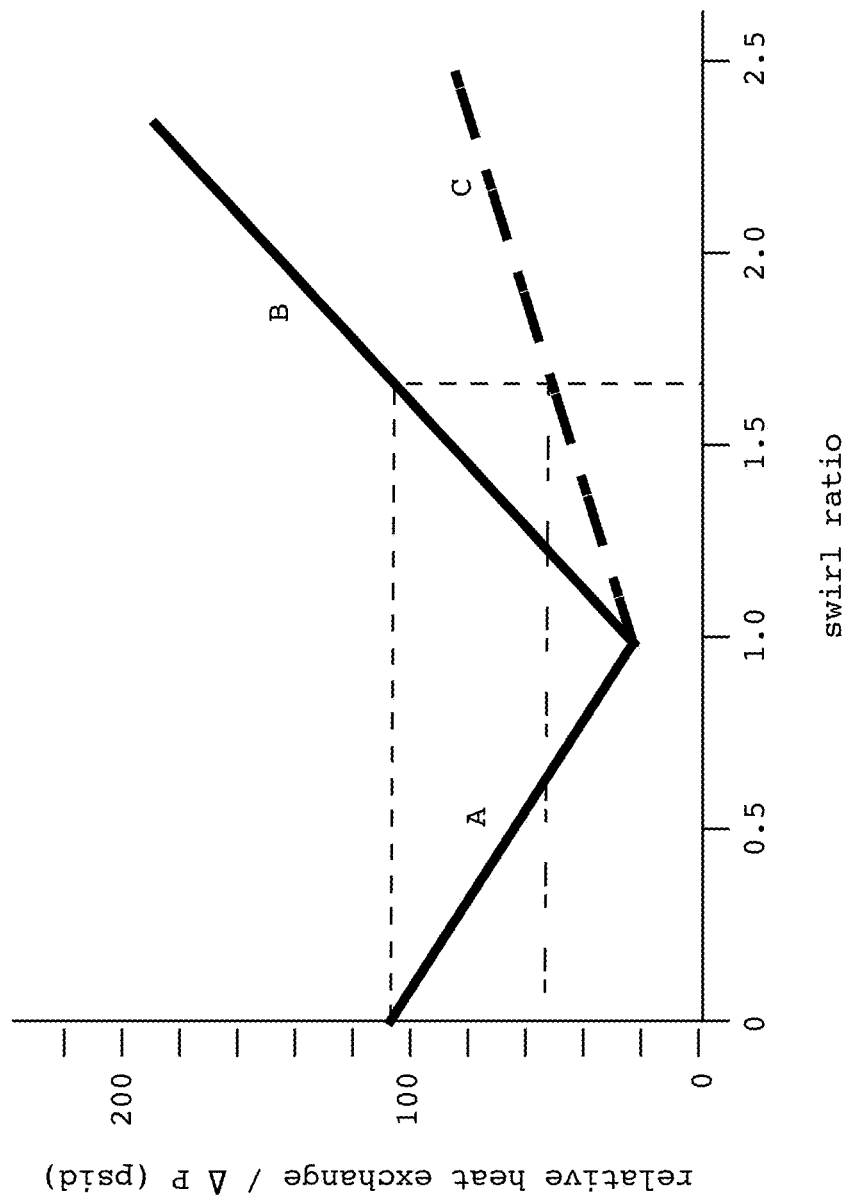
FIG. 7 shows a graphical representation of relative heat exchange and pressure difference as a function of swirl ratio according to various embodiments of the invention.

FIG. 7 shows a graphical representation of relative heat exchange and pressure difference as a function of swirl ratio, based on results observed by Applicants according to various embodiments of the invention. As can be seen in FIG. 7, relative heat exchange initially decreases along portion A as swirl ratio increases toward 1.0, at which point relative heat transfer reaches its minimum. This is understandable, since at a swirl ratio of 1.0 the speed of the cooling steam is equal to the speed of the rotor, i.e., the rotor is essentially bathed in the cooling steam with no additional heat transfer achieved via the relative movement of the cooling steam with respect to the rotor. The relative heat exchange values along portion A are those achievable using cooling steam without employing the angled passages 30, 38 (FIG. 1) and/or inducer plates 180 (FIG. 2) according to various embodiments of the invention.

Still referring to FIG. 7, as the swirl ratio increases above 1.0, as may be achieved according to various embodiments of the invention, the relative heat exchange increases along portion B until, at about 1.7, the relative heat exchange is equal to the maximum relative heat exchange achievable without the invention, i.e., with a swirl ratio less than 1.0. Swirl ratios above about 1.7 result in relative heat exchange greater than the maximum that can be achieved by a swirl ratio less than 1.0. As can be seen in FIG. 7, at a swirl ratio of about 2.5, the relative heat exchange is about twice the maximum achievable with a swirl ratio less than 1.0.

Portion C of FIG. 7 shows the pressure difference needed to generate the corresponding swirl ratio. As can be seen, a pressure difference of about 50 psid is needed to achieve a swirl ratio of about 1.7. From that point, pressure difference increases result in further increases of swirl ratio, leading to higher relative heat exchange. This reflects the fact that the relative heat exchange includes a component corresponding to the pressure difference shown in portion C as well as a component corresponding to the angling of the cooling steam achieved using the angled passages and/or inducer plates according to various embodiments of the invention. It also demonstrates the function of the first seal 26 in FIG. 1 in building the needed pressure to drive cooling flow through angled passage and achieve desirable swirl ratio.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any related or incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A turbine comprising:
    a rotor including a first bucket root; and
    a stator member having:
        a rotor bore within which at least a portion of the rotor is disposed;
        a facing end adjacent to the first bucket root of the rotor;
        a plurality of seals within the rotor bore for sealing against the rotor, the plurality of seals including a first seal nearest the facing end and a second seal adjacent to the first seal; and
        a plurality of passages, each passage extending from a surface of the rotor bore at a point between the first seal and the second seal and extending through the facing end.

2. The turbine of claim 1, wherein the first seal is selected from a group consisting of: a brush seal and a packing ring.

3. The turbine of claim 2, wherein the first seal is a packing ring and the second seal is a packing ring.

4. The turbine of claim 1, further comprising an inducer plate attached to the facing end, the inducer plate including a plurality of passages extending from a first surface adjacent to the facing end through to a second surface substantially parallel to the first surface, wherein at least one of the plurality of passages of the inducer plate is in communication with one of the plurality of passages of the stator member.

5. The turbine of claim 4, wherein the at least one of the plurality of passages of the inducer plate is angled in a direction of rotation of the rotor.

6. The turbine of claim 4, wherein the at least one of the plurality of passages of the inducer plate is angled within the inducer plate at between about 45 degrees and about 90 degrees.

7. The turbine of claim 6, wherein the at least one of the plurality of passages of the inducer plate is angled within the inducer plate at between about 60 degrees and about 85 degrees.

8. The turbine of claim 7, wherein the at least one of the plurality of passages of the inducer plate is angled within the inducer plate at an angle of about 80 degrees.

9. The turbine of claim 1, wherein, in an operative state, a quantity of steam is diverted from between the first seal and the second seal, through the plurality of passages of the stator member, and into a wheel space cavity between the facing end and the first bucket root.

10. The turbine of claim 9, wherein the plurality of passages of the stator member impart onto the quantity of steam a swirl ratio greater than about 1.6.

11. The turbine of claim 10, wherein the swirl ration is between about 1.7 and about 2.

12. The turbine of claim 9, wherein the quantity of steam has a first pressure at the point between the first seal and the second seal that is at least 50 psi greater than a second pressure within the wheel space cavity.

13. The turbine of claim 12, wherein the first pressure is about 80 psi greater than the second pressure.

14. A stator member for a turbine, the stator member comprising:
    an elongate body;
    a rotor bore within and along a longitudinal axis of the elongate body;
    at least one passage having a first opening on a surface of the rotor bore and extending through the elongate body to a second opening on a facing end of the elongate body, the facing end lying along a plane substantially perpendicular to the longitudinal axis of the elongate body; and
    a first recess along the surface of the rotor bore for containing a sealing device, the first recess being disposed between the facing end and the first opening of the at least one passage.

15. The stator member of claim 14, further comprising a second recess along the surface of the rotor bore for containing a second sealing device, the second recess being disposed adjacent the first opening of the at least one passage, opposite the first recess.

16. The stator member of claim 14, further comprising an inducer plate affixed to the facing end, the inducer plate including at least one passage extending from a first surface adjacent the facing end through to a second surface substantially parallel to the first surface, the at least one passage being in communication with the at least one passage of the stator member.

17. The stator member of claim 16, wherein the at least one passage of the inducer plate is angled within the inducer plate at between about 45 degrees and about 90 degrees.

18. The stator member of claim 17, wherein the at least one passage of the inducer plate is angled within the inducer plate at between about 60 degrees and about 85 degrees.

19. The stator member of claim 18, wherein the at least one passage of the inducer plate is angled within the inducer plate at about 80 degrees.

20. The stator member of claim 16, wherein the at least one passage of the inducer plate is angled in a direction of rotation of the rotor.

* * * * *